(12) United States Patent
Doyle et al.

(10) Patent No.: US 10,845,193 B2
(45) Date of Patent: Nov. 24, 2020

(54) LEVEL WITH REMOVABLE END CAP

(71) Applicant: Milwaukee Electric Tool Corporation, Brookfield, WI (US)

(72) Inventors: Matthew Doyle, Elm Grove, WI (US); Fraizier Reiland, Milwaukee, WI (US); Lauren Weigel, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 519 days.

(21) Appl. No.: 15/849,104

(22) Filed: Dec. 20, 2017

(65) Prior Publication Data

US 2018/0172443 A1 Jun. 21, 2018

Related U.S. Application Data

(63) Continuation of application No. PCT/US2017/067601, filed on Dec. 20, 2017.

(60) Provisional application No. 62/437,416, filed on Dec. 21, 2016.

(51) Int. Cl.
*G01C 9/26* (2006.01)
*G01C 9/02* (2006.01)
*G01C 9/34* (2006.01)

(52) U.S. Cl.
CPC ............... *G01C 9/02* (2013.01); *G01C 9/34* (2013.01)

(58) Field of Classification Search
CPC .................................. G01C 9/26; G01C 9/28
USPC ............................................ 33/379, 381, 384
See application file for complete search history.

(56) References Cited

U.S. PATENT DOCUMENTS

| | | |
|---|---|---|
| 232,982 A | 10/1880 | Langdon |
| 675,464 A | 6/1901 | Carlson |
| 730,790 A | 6/1903 | Newman |
| 1,033,742 A | 7/1912 | Skates |
| 1,145,195 A | 7/1915 | Heisler |
| 2,171,971 A | 9/1939 | Cravaritis et al. |
| 2,535,791 A | 12/1950 | Fluke |
| 2,634,509 A | 4/1953 | Roberts |
| 2,695,949 A | 11/1954 | Ashwill |
| 2,789,363 A | 4/1957 | Miley |
| 2,939,947 A | 10/1958 | Schultz |
| 3,036,791 A | 2/1960 | Siggelkow |
| 3,046,672 A | 7/1962 | Lace |

(Continued)

FOREIGN PATENT DOCUMENTS

| | | |
|---|---|---|
| CN | 101487701 | 8/2011 |
| DE | 7233283 U | 2/1973 |

(Continued)

OTHER PUBLICATIONS

International Search Report and Written Opinion for PCT/US2017/067601, dated Mar. 26, 2018, 14 pages.

(Continued)

*Primary Examiner* — George B Bennett
(74) *Attorney, Agent, or Firm* — Reinhart Boerner Van Deuren s.c.

(57) ABSTRACT

A level with a removable end cap is provided. The level includes a hollow level body. The end cap includes an outer member and locking member received within the outer member. The locking member is inserted into the outer member pushing a moveable portion of the outer member into a frictional engagement that holds the end cap assembly in place relative to the level body.

20 Claims, 8 Drawing Sheets

(56) References Cited

U.S. PATENT DOCUMENTS

| | | | |
|---|---|---|---|
| 3,100,937 A | 8/1963 | Burch | |
| 3,110,115 A | 11/1963 | Hubbard | |
| 3,116,563 A | 1/1964 | Gelb an | |
| 3,180,036 A | 4/1965 | Meeks | |
| 3,187,437 A | 6/1965 | Hampton | |
| 3,213,545 A | 10/1965 | Wright | |
| 3,279,080 A | 10/1966 | Stepshinski | |
| 3,832,782 A | 9/1974 | Johnson et al. | |
| 3,881,259 A | 5/1975 | Pigeon | |
| 4,099,331 A | 7/1978 | Peterson et al. | |
| 4,126,944 A | 11/1978 | Burkhart | |
| 4,338,725 A | 7/1982 | Martin et al. | |
| 4,407,075 A | 10/1983 | MacDermott et al. | |
| 4,463,501 A | 8/1984 | Wright et al. | |
| 4,546,774 A | 10/1985 | Haught | |
| 4,589,213 A | 5/1986 | Woodward | |
| 4,593,475 A | 6/1986 | Mayes | |
| 4,793,069 A | 12/1988 | McDowell | |
| 4,888,880 A | 12/1989 | Parker | |
| 5,077,911 A | 1/1992 | von Wedemeyer | |
| 5,080,317 A | 1/1992 | Letizia | |
| 5,119,936 A | 6/1992 | Sevey | |
| 5,165,650 A | 11/1992 | Letizia | |
| 5,188,234 A | 2/1993 | Fukuda et al. | |
| 5,199,177 A | 4/1993 | Hutchins et al. | |
| 5,388,338 A | 2/1995 | Majors | |
| 5,412,876 A | 5/1995 | Scheyer | |
| 5,479,717 A | 1/1996 | von Wedemeyer | |
| 5,495,673 A | 3/1996 | Gardiner et al. | |
| 5,505,001 A | 4/1996 | Schaver | |
| 5,535,523 A | 7/1996 | Endris | |
| 5,659,967 A | 8/1997 | Dufour | |
| 5,671,856 A | 9/1997 | Lisch | |
| 5,709,034 A | 1/1998 | Kohn | |
| 5,749,152 A | 5/1998 | Goss et al. | |
| 5,755,037 A | 5/1998 | Stevens | |
| 5,784,792 A | 7/1998 | Smith | |
| 5,813,130 A | 9/1998 | MacDowell | |
| 5,878,802 A | 3/1999 | Richter et al. | |
| 6,003,234 A | 12/1999 | Seibert | |
| 6,029,360 A | 2/2000 | Koch | |
| 6,070,336 A | 6/2000 | Rodgers | |
| 6,173,507 B1 | 1/2001 | Scarborough | |
| 6,213,672 B1 | 4/2001 | Varga | |
| 6,381,859 B1 | 5/2002 | Wedemeyer | |
| 6,430,827 B2 * | 8/2002 | Ruther | B25H 7/00 |
| | | | 33/379 |
| 6,568,095 B2 | 5/2003 | Snyder | |
| 6,675,490 B1 | 1/2004 | Krehel et al. | |
| 6,732,441 B2 | 5/2004 | Charay et al. | |
| 6,760,975 B1 | 7/2004 | Schmidt | |
| 6,782,628 B2 | 8/2004 | Liao | |
| 6,785,977 B1 | 9/2004 | Crichton | |
| 6,792,686 B2 | 9/2004 | Krehel et al. | |
| 6,792,868 B2 | 9/2004 | Teilhol et al. | |
| 6,818,824 B1 | 11/2004 | Marcou et al. | |
| 6,839,973 B1 | 1/2005 | Woodward | |
| 6,915,585 B2 | 7/2005 | Von Wedemeyer | |
| 6,935,035 B2 | 8/2005 | Smith | |
| 6,988,320 B2 | 1/2006 | Kallabis et al. | |
| 7,028,413 B2 | 4/2006 | Filipescu | |
| 7,073,270 B2 | 7/2006 | Kim | |
| 7,089,676 B2 | 8/2006 | Godinez | |
| 7,150,106 B2 | 12/2006 | Kallabis et al. | |
| 7,152,335 B2 | 12/2006 | Nichols | |
| 7,204,029 B2 | 4/2007 | Trait et al. | |
| 7,228,637 B2 | 6/2007 | Kim | |
| 7,278,218 B2 | 10/2007 | Levine | |
| 7,316,074 B2 | 1/2008 | Thin et al. | |
| 7,343,692 B2 | 3/2008 | Gould | |
| 7,360,316 B2 | 4/2008 | Hoover et al. | |
| 7,363,719 B2 | 4/2008 | Levinson et al. | |
| 7,392,594 B2 | 7/2008 | Kesler | |
| 7,398,600 B2 | 7/2008 | Ming | |
| 7,406,773 B2 | 8/2008 | Helga | |
| 7,409,772 B1 | 8/2008 | Morrissey | |
| 7,467,475 B1 | 12/2008 | Cheek | |
| 7,472,486 B2 | 1/2009 | Trait et al. | |
| 7,472,487 B2 | 1/2009 | Trait et al. | |
| 7,484,307 B2 | 2/2009 | Abrecht | |
| 7,513,055 B2 | 4/2009 | Montgomery | |
| 7,513,056 B2 | 4/2009 | Hobden et al. | |
| 7,520,065 B2 | 4/2009 | Vernola | |
| 7,536,798 B2 | 5/2009 | Silberberg | |
| 7,552,540 B2 | 6/2009 | Ming | |
| 7,565,749 B2 | 7/2009 | Helcia | |
| 7,568,292 B2 | 8/2009 | Maruyama | |
| 7,607,235 B1 | 10/2009 | Morrissey | |
| 7,644,506 B2 | 1/2010 | Wong | |
| 7,675,612 B2 | 3/2010 | Kallibis | |
| 7,685,723 B2 | 3/2010 | Kallibis | |
| 7,748,128 B2 | 4/2010 | Martin | |
| 7,735,229 B2 | 6/2010 | Allemand | |
| 7,765,706 B2 | 8/2010 | Scheyer | |
| 7,770,298 B1 | 8/2010 | Wojciechowski et al. | |
| 7,802,371 B2 | 9/2010 | Ming | |
| 7,827,699 B2 | 11/2010 | Montgomery | |
| 7,832,112 B2 | 11/2010 | Christianson | |
| 7,866,055 B2 | 1/2011 | Zhang et al. | |
| 7,946,045 B2 | 5/2011 | Allemand | |
| 8,011,108 B2 | 9/2011 | Upthegrove | |
| 8,061,051 B2 | 11/2011 | Allemand | |
| 8,109,005 B2 | 2/2012 | Hudson et al. | |
| 8,291,605 B2 | 10/2012 | Christianson | |
| 8,336,221 B2 | 12/2012 | Steele et al. | |
| 8,413,342 B2 | 4/2013 | Christianson | |
| 8,443,812 B2 | 5/2013 | Regalado et al. | |
| 8,631,584 B2 | 1/2014 | Steele et al. | |
| 8,826,554 B2 | 9/2014 | Bariteau | |
| 8,850,710 B1 | 10/2014 | Rodrigue et al. | |
| 8,910,390 B2 | 12/2014 | Steele et al. | |
| 8,925,212 B2 | 1/2015 | Allemand | |
| 9,021,710 B2 | 5/2015 | Silberberg | |
| 9,909,870 B2 * | 3/2018 | Neitzell | G01C 9/28 |
| 2001/0013176 A1 | 8/2001 | Ruther | |
| 2003/0005590 A1 | 1/2003 | Snyder | |
| 2005/0155241 A1 | 7/2005 | Scheyer | |
| 2005/0160610 A1 | 7/2005 | Scheyer | |
| 2005/0223577 A1 | 10/2005 | Scarborough | |
| 2005/0229417 A1 * | 10/2005 | Kim | G01C 9/28 |
| | | | 33/451 |
| 2006/0053563 A1 | 3/2006 | Skinner | |
| 2006/0123644 A1 * | 6/2006 | Szumer | G01C 9/28 |
| | | | 33/374 |
| 2006/0143933 A1 | 7/2006 | Kallabis et al. | |
| 2006/0196061 A1 | 9/2006 | Nichols | |
| 2006/0283031 A1 | 12/2006 | Ming | |
| 2007/0028472 A1 | 2/2007 | Brown | |
| 2007/0113413 A1 | 5/2007 | Feliciano | |
| 2007/0113414 A1 | 5/2007 | Levinson et al. | |
| 2007/0175056 A1 | 8/2007 | Tran et al. | |
| 2007/0234581 A1 | 10/2007 | Ming | |
| 2008/0022543 A1 | 1/2008 | Kesler | |
| 2008/0141546 A1 | 6/2008 | Strutt et al. | |
| 2008/0222907 A1 | 9/2008 | Silberberg | |
| 2008/0271331 A1 | 11/2008 | Allemand | |
| 2008/0282562 A1 | 11/2008 | Allemand | |
| 2008/0301957 A1 | 12/2008 | Vernola | |
| 2009/0013545 A1 | 1/2009 | Cheek | |
| 2009/0158605 A1 | 6/2009 | Montgomery | |
| 2010/0000105 A1 | 1/2010 | Zhang | |
| 2010/0000106 A1 | 1/2010 | Zhang | |
| 2010/0005671 A1 | 1/2010 | Hudson et al. | |
| 2010/0095543 A1 | 4/2010 | Inthavong | |
| 2010/0205814 A1 | 8/2010 | Allemand | |
| 2011/0099823 A1 | 5/2011 | Christianson et al. | |
| 2011/0099824 A1 | 5/2011 | Christianson et al. | |
| 2011/0119941 A1 | 5/2011 | Steele et al. | |
| 2011/0265338 A1 | 11/2011 | Christianson et al. | |
| 2013/0091717 A1 | 4/2013 | Steele | |
| 2013/0167387 A1 | 7/2013 | Lueck et al. | |
| 2013/0305548 A1 | 11/2013 | Lueck et al. | |
| 2014/0007438 A1 | 1/2014 | Silberberg | |
| 2014/0007439 A1 | 1/2014 | Silberberg | |

(56) References Cited

U.S. PATENT DOCUMENTS

| | | | | |
|---|---|---|---|---|
| 2014/0101950 A1* | 4/2014 | Zhuang | ............ | G01C 9/32 |
| | | | | 33/348.2 |
| 2014/0373371 A1 | 12/2014 | Silberberg | | |
| 2016/0061604 A1* | 3/2016 | Wojciechowski | ....... | G01C 9/02 |
| | | | | 33/301 |
| 2016/0138916 A1 | 5/2016 | Neitzell | | |
| 2016/0138917 A1 | 5/2016 | Schwoegler | | |
| 2016/0138918 A1 | 5/2016 | Neitzell | | |
| 2018/0094925 A1* | 4/2018 | Mackey | ............ | G01C 9/34 |
| 2019/0056225 A1* | 2/2019 | Guma | ............ | G01C 9/26 |

FOREIGN PATENT DOCUMENTS

| | | |
|---|---|---|
| EP | 126844 | 12/1984 |
| EP | 919786 | 6/1999 |
| EP | 1167921 | 1/2002 |
| EP | 1225671 | 7/2002 |
| EP | 1340960 | 9/2003 |
| EP | 2056065 | 5/2009 |
| GB | 1529608 | 10/1978 |
| GB | 2364950 | 2/2002 |
| GB | 2436432 | 9/2007 |
| JP | H11173843 | 7/1999 |
| JP | H11183170 | 7/1999 |
| WO | WO 2008144545 | 11/2008 |

OTHER PUBLICATIONS

International Search Report and Written Opinion for Application No. PCT/US2015/060652 dated Jan. 28, 2016 (13 pages).

* cited by examiner

LEVEL WITH REMOVABLE END CAP

CROSS-REFERENCE TO RELATED PATENT APPLICATIONS

This application is a continuation of International Application No. PCT/US2017/067601, filed Dec. 20, 2017, which claims priority to and the benefit of U.S. Provisional Application No. 62/437,416, filed Dec. 21, 2016, which are incorporated herein by reference in their entireties.

BACKGROUND OF THE INVENTION

Levels are used to measure the angle of surfaces on construction sites and in other locations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
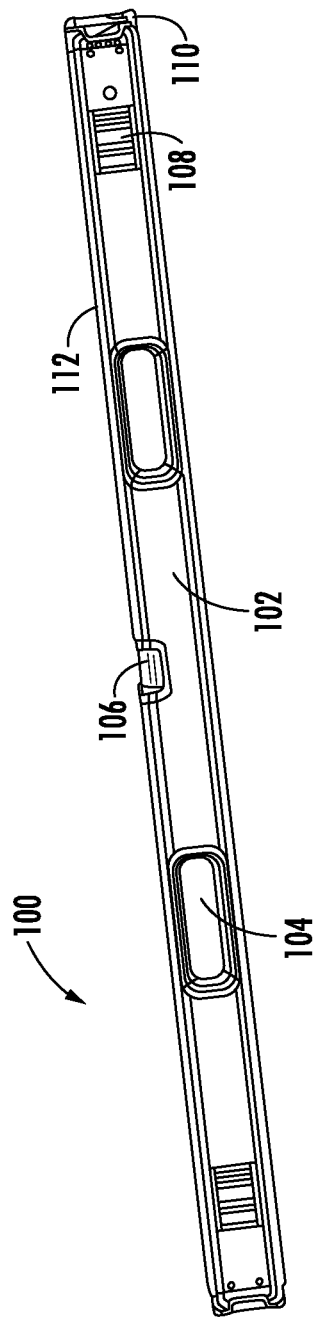
FIG. 1 is a perspective view of a level.

FIG. 1 illustrates a level 100 of the type typically used to measure the level or the plumb of various surfaces during construction or home remodeling. The illustrated level 100 includes a body 102 that defines a planar surface 112 and first and second handles 104. The body 102 also supports a center vial 106 that is arranged to measure the level (relative to horizontal) orientation of a surface and at least one plumb vial 108 arranged to measure the plumb (vertical orientation) of a surface. In the illustrated construction, spirit vials are used to measure the surfaces with other constructions including other arrangements including digital levels or accelerometers.

Figure 3:
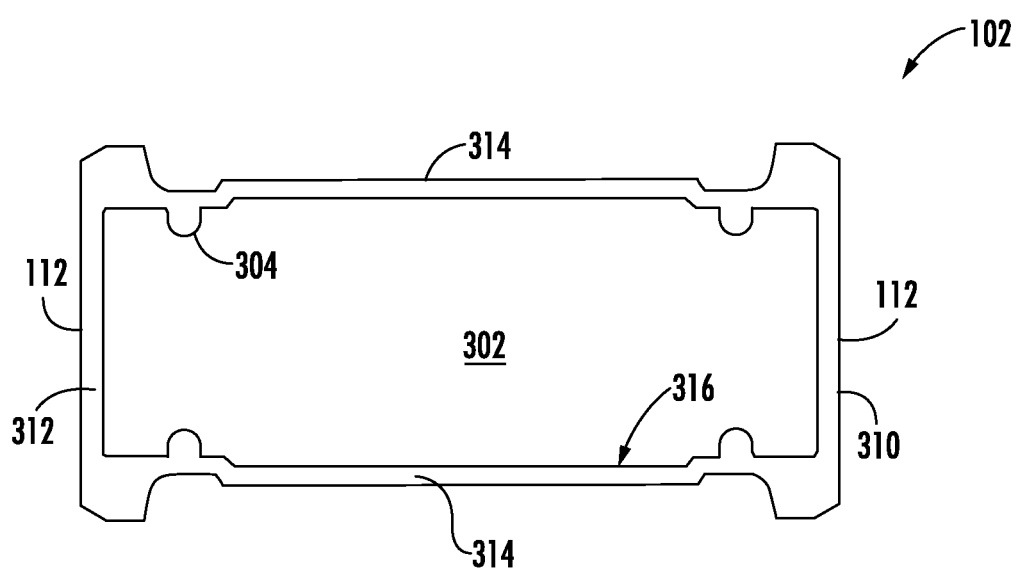
FIG. 3 is an end view of the level illustrating the cross section of the level body.

In the illustrated construction, the level 100 is a box-type level where the body 102 is substantially box shaped as illustrated in FIG. 3. As shown in FIG. 3, in one embodiment, body 102 is formed from a piece of material (e.g., metal material) that is contiguous at at least some longitudinal cross-sectional positions. Level body includes upper wall 310, lower wall 312 and opposing sidewalls 314, and the inner surfaces 316 of these walls define a hollow open area, shown as hollow space 302. In this construction, the body 102 defines a hollow space 302 and includes a first rib 304 that extends along the interior surface 316 of the body 102. The illustrated construction includes ribs 304 disposed adjacent each corner of the body 102.

Figure 2:
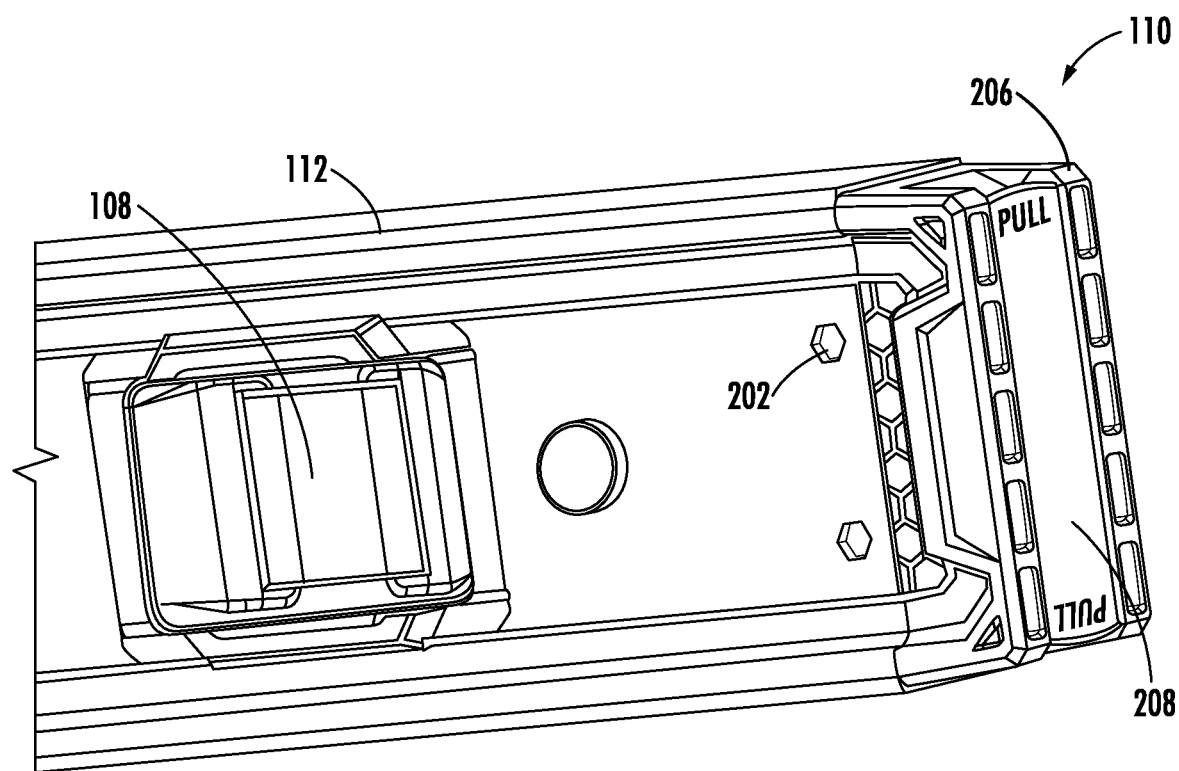
FIG. 2 is an enlarged perspective view of the level of FIG. 1 including an end cap.

Returning to FIG. 1, the level 100 includes an end cap assembly, shown as an end cap 110, at each end of the level 100. The end cap 110 is arranged to protect the end of the level 100 and is also arranged to be removable by the user without damaging the end cap 110. With reference to FIG. 2 the end cap 110 includes an outer member 206, a locking member 208, and a clip 402 (illustrated in FIG. 4) that fit within the body 102 or engage the body 102 to form the end cap 110.

In general, clip 402 is received within hollow area 302 of level body 102, and outer member 206 is received within hollow area 302 of level body 102 and within clip 402. Next locking member 208 is received within outer member 206 and pushes a moveable portion of outer member 206 in to a frictional engagement that couples outer member 206 in a fixed position relative to the level body. As will be discussed below, in a specific embodiment, this pushing causes a projection on the outer member 206 to engage an aperture of the clip 402 coupling the outer member to the level body. In this manner, the locking member 208 is moveable within the outer member 206 between a locked in which frictional coupling is generated coupling the end cap to the level body and unlocked position in which the end cap is removable from the level body.

Figure 4:
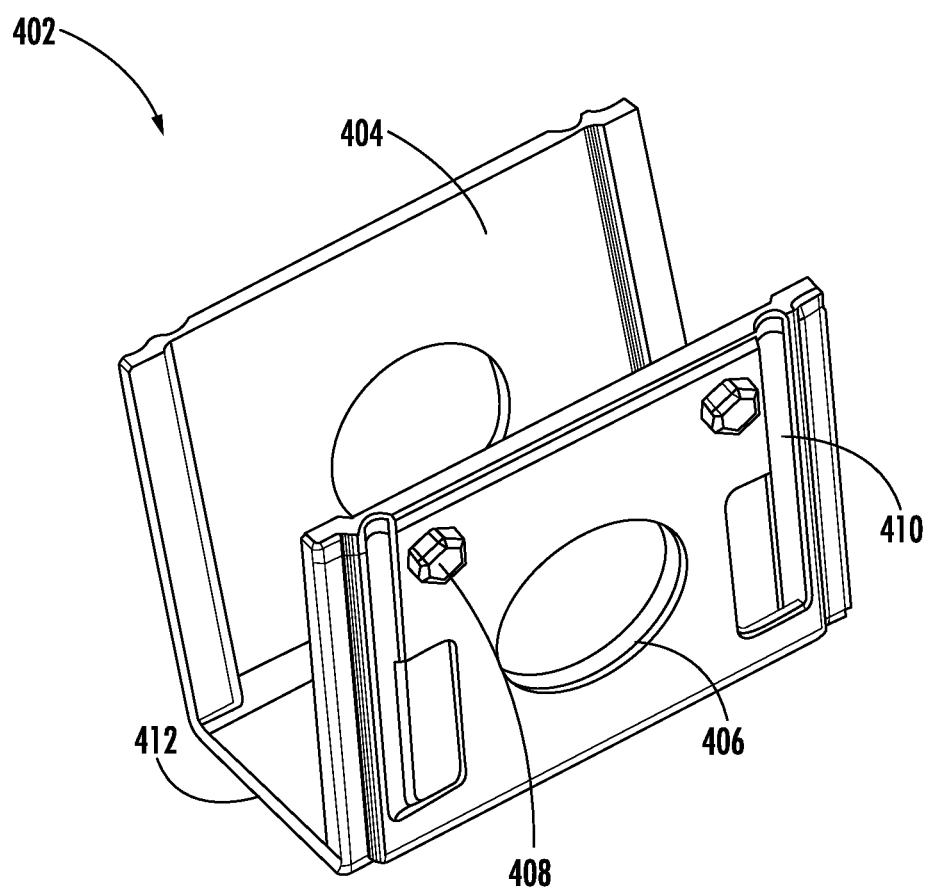
FIG. 4 is a perspective view of an end cap clip.

With reference to FIG. 4 the clip 402 is illustrated in its uninstalled or free configuration. The clip 402 includes clip sidewalls, shown as a first wall 404 and a second wall 404 opposite the first wall 404, that both extend outward from a clip end wall 412. The walls 404 are arranged to define an oblique angle therebetween when in the free configuration. Each wall 404 includes an aperture 406 in about the center of each wall 404, and a rib slot 410 and a hexagonal boss 408 on each end of the wall 404. As shown, rib slot 410 and boss 408 are formed along the outer surface of wall 404, and boss 408 projects outward from the outer surface of wall 404.

To mount end cap 110 to level body 102, the clip 402 is arranged in the body 102 with each of the clip sidewalls 404 running along and generally parallel to the inner surfaces of body sidewalls 314 with each hexagonal boss 408 disposed within a hexagonal aperture 202 (shown in FIG. 2). Of course, shapes other than hexagonal could be employed if desired. In addition, each rib slot 410 receives a rib 304 to properly align the clip 402 within space 302 of body 102. To position the clip 402 in the body 102, the walls 404 are moved inward toward one another (e.g., by squeezing walls 404) allowing clip 402 to slide into body 102. Walls 404 are biased outward, and this bias helps to retain the clip 402 within the body 102. In other constructions, an adhesive can be used to permanently attach the clip 402 to the body 102.

Figure 6:
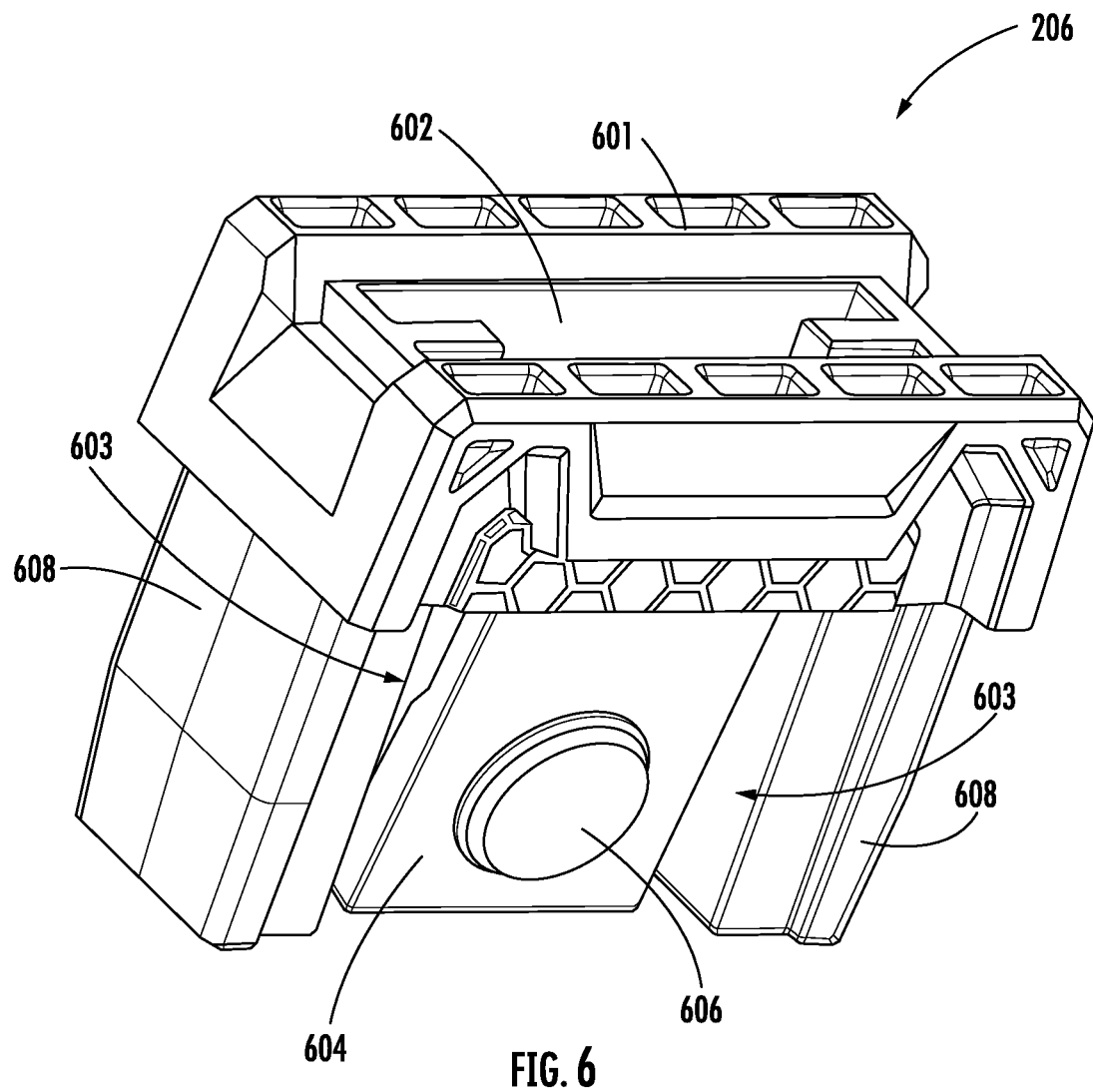
FIG. 6 is a perspective view of an end cap outer member.

As shown in FIG. 6, the outer member 206 is an elongated member with a cap portion 601 that remains outside of the body 102 when installed, and a side arm 608 at each of the upper and lower ends and extending away from the cap portion 601 and arranged to engage the inner surfaces of the body 102. When installed side arms 608 are positioned along the inner surfaces of upper wall 310 and lower wall 312 of level body 102. A moveable portion, shown as first movable wall 604, includes a projection, shown as locking button 606, that is fixed with respect to the movable wall 604 and is preferably formed as one piece with the movable wall 604. A second movable wall (best illustrated in FIG. 7) is positioned opposite the movable wall 604 and is substantially identical to the movable wall 604. In generally moveable walls 604 are separated from side arms 608 by gaps 603. As will be explained below, this separation allows side arms 608 to be pushed outward by locking member 208 to create a frictional coupling that secures the end cap to the level body. A locking member aperture 602 is formed down the center of the outer member 206 and is sized to receive the locking member 208.

Figure 5:
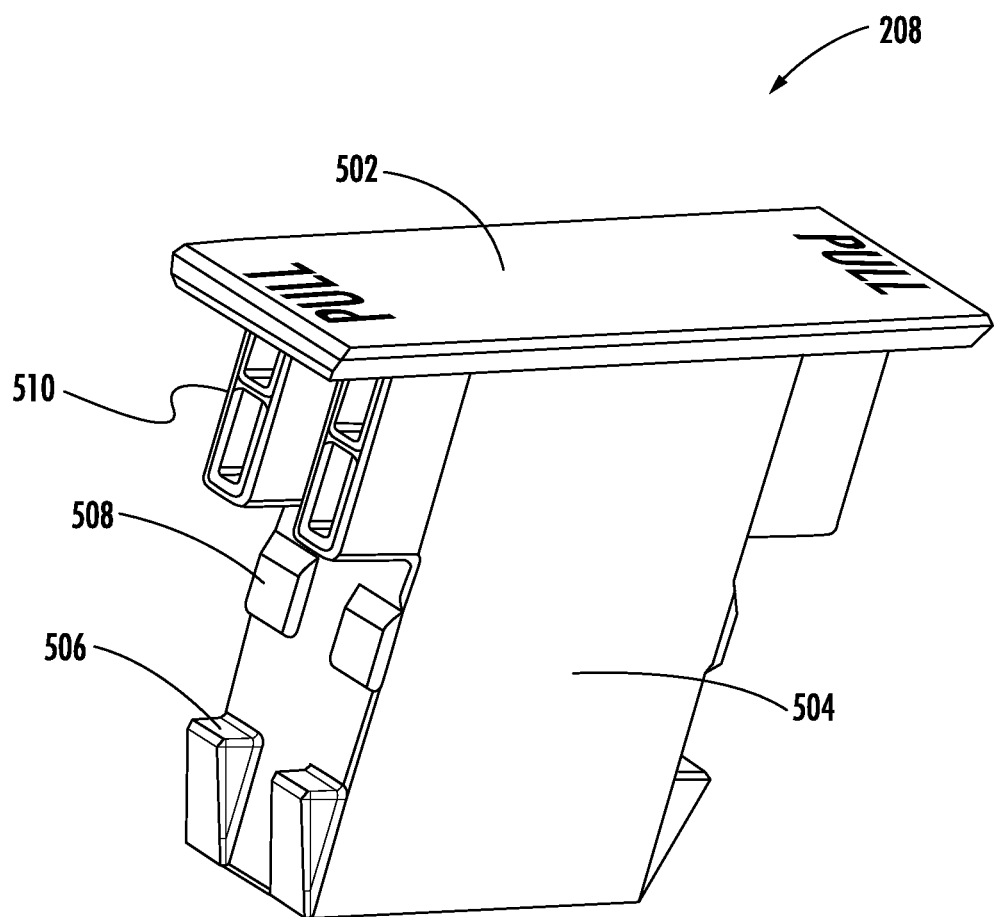
FIG. 5 is a perspective view of an end cap locking member.

Turning to FIG. 5, the locking member 208 includes a pull portion 502 and a block portion 504 that extends from the pull portion 502. The pull portion 502 is arranged to remain outside of the outer member 206 to give the user a surface to grab to move the locking member to the unlocked position relative to outer member 206 when it is desired to remove the end cap 110. The block portion 504 is a rectangular cross section portion that is substantially rigid. In addition, at least one engagement bump 508, one tab 506, and one guide member 510 are formed on each side of the outer member 206.

Figure 7:
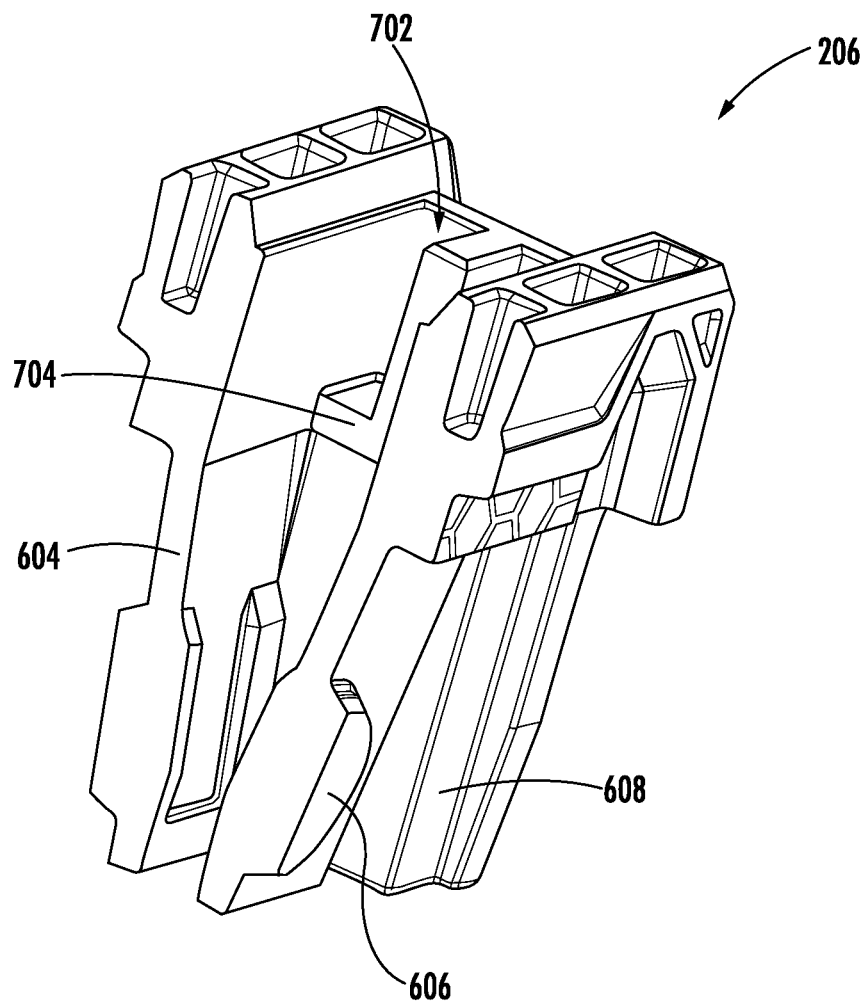
FIG. 7 is a section view of the end cap outer member of FIG. 6.
Figure 8:
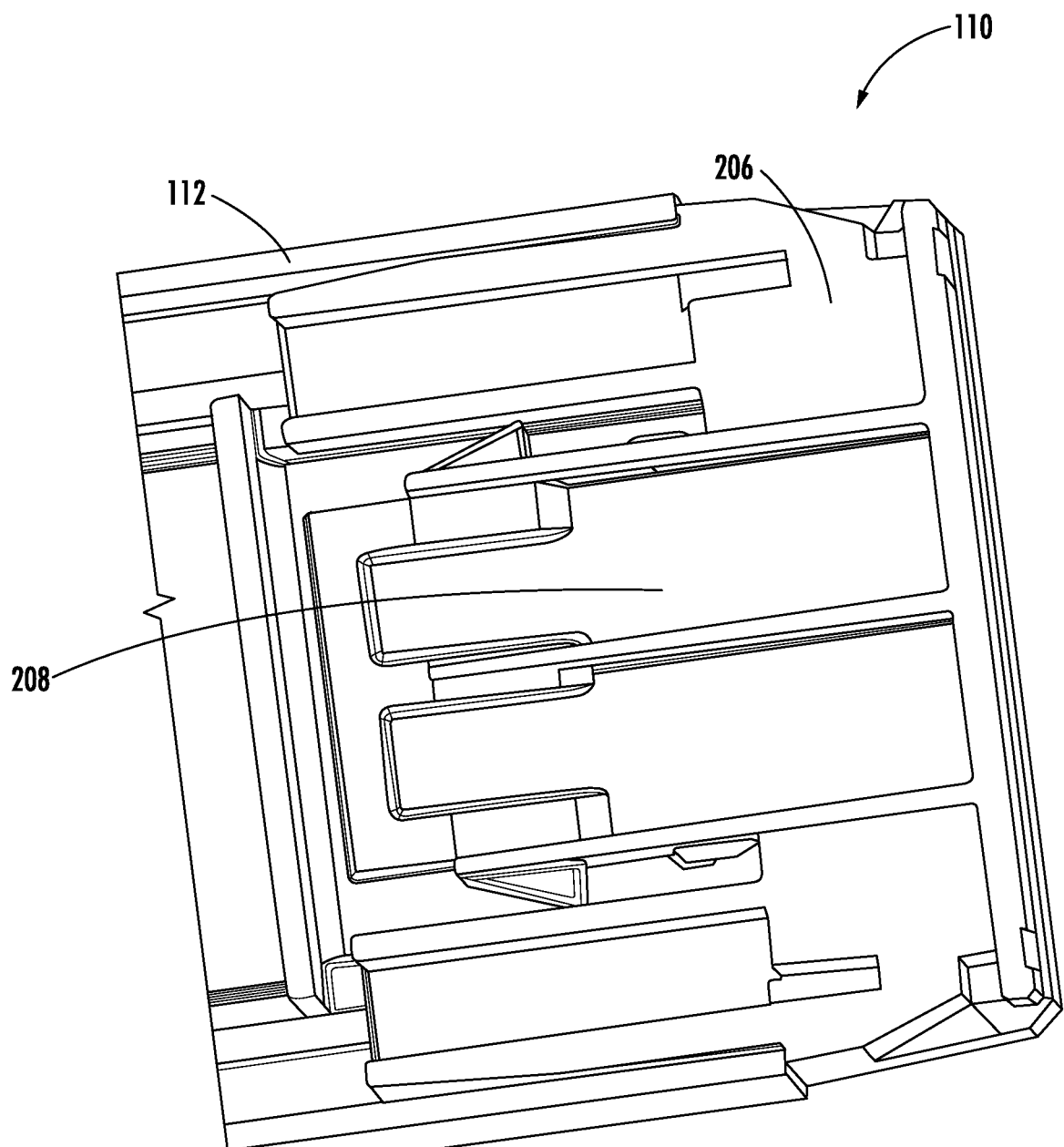
FIG. 8 is a perspective longitudinal cross sectional view of the end cap of the level of FIG. 1.

FIG. 7 best illustrates the interior of the locking member aperture 602 and the space between the first movable wall 604 and the second movable wall. As shown in FIG. 7, the outer member 206 includes a guide slot 702 positioned and sized to receive the guide member 510 of the locking member 208. The outer member 206 also defines a cooperating surface, shown as locking surface 704, that operates to maintain the connection between the locking member 208 and the outer member 206 when the end cap 110 is removed. In general and as will be explained in more detail below, locking member 208 includes a stop structure that engages a cooperating surface of outer member 206 such that full removal of the locking member from the outer member is prevented when the locking member is in an unlocked position (i.e., outer member 206 and locking member 208 are held together when the end cap is removed from the level body).

With reference to FIGS. 4-8 the assembly and use of the end cap 110 will now be described. First, the clip 402 is installed into the body 102 as discussed above. When installed walls 404 and clip 402 generally are positioned adjacent to and/or in contact with the inner surfaces of body 102 that defines hollow area 302. In this manner, clip 402 positions its openings 406 within level body 102. In this manner, as will be explained in more detail below, clip 402 allows for mounting of outer member 206 via engagement between locking button 606 and clip openings 406, without requiring engagement between outer member 206 and holes formed through the side walls of level body 102. In some embodiments, the clip 402 is not intended to be removed once installed into the body 102.

Once the clip 402 is mounted into level body 102, the outer member 206 is then installed into the body 102 and into the clip 402. The outer member 206 is preferably manufactured from a relatively resilient or soft material such as rubber. Thus, the movable walls 604 are generally free to move and do not engage the aperture 406 to lock the outer member 206 in place until insertion of locking member 208.

The locking member 208 is next inserted into the locking member aperture 602 of outer member 206. The locking member 208 is preferably formed from a hard, less resilient material than the outer member 206. For example, a hard plastic might be used for the locking member 208, while a softer or more flexible material may be used for at least portions of outer member 206. In specific embodiments, at least a portion of moveable walls 604 are formed from a material that is more flexible than locking member 208. In specific embodiments, moveable walls 604 are formed, at least in part, from a material that has a lower durometer and/or higher modulus of elasticity than that of a material of locking member 208.

When locking member 208 is installed into outer member 206 for the first time, each tab 506 is forced past the locking surface 704 of the outer member 206. The resiliency of the outer member 206 along with the ramped arrangement of each tab 506 facilitate this insertion. As the block portion 504 moves between the movable walls 604 of outer member 206, the movable walls 604 are deflected outward until each locking button 606 engages an aperture 406 of clip 402 to lock the end cap 110 in position relative to level body 102. In this arrangement, locking button 606 is located completely within the hollow area 302 and does not extend through level body 102. In this position, each guide member 510 is received in a guide slot 702. In addition, each engagement bump 508 cooperates with the guide member 510 to sandwich the locking surface 704 and hold the locking member 208 in the locked position.

To remove the end cap 110, the user pulls on the locking member 208 to remove the block portion 504 from between the movable walls 604 moving locking member outward away from level body 102. In the embodiment shown, each tab 506 engages the locking surface 704 to inhibit the full removal of the locking member 208 from the outer member 206. In other words, engagement between tabs 506 and locking surface 704 acts to hold locking member 208 to outer member 206, when in the unlocked position. With locking member 208 in the unlocked position, block portion 504 is moved such that block portion 504 does not push moveable walls 604 into engagement with the openings of the clip. Thus, without the block portion 504 providing structural support for the movable walls 604, the movable walls 604 are free to deflect inwardly to release each locking button 606 from each aperture 406, thereby allowing the removal of the end cap 110. In specific embodiments, moveable walls 604 are not biased inward, and in such embodiments, the end cap structure is shaken such that buttons 606 disengage from apertures 406.

It should be understood that the figures illustrate the illustrative embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various illustrative embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or elements, and is not intended to be construed as meaning only one. As used herein, rigidly coupled refers to two components being coupled in a manner such that the components move together in fixed positional relationship when acted upon by a force.

Various embodiments of the invention relate to any combination of any of the features, and any such combination of features may be claimed in this or future applications. Any of the features, elements, or components of any of the illustrative embodiments discussed above may be utilized alone or in combination with any of the features, elements, or components of any of the other embodiments discussed above.

What is claimed is:

1. A level comprising:
a level body comprising an upper wall, a lower wall and two sidewalls extending therebetween, wherein inner surfaces of each of the upper wall, of the lower wall and of the two sidewalls define a hollow open area;
a level vial supported by the level body; and
an end cap assembly removably coupled to an end of the level body, the end cap assembly comprising:
a clip received within the hollow open area of the level body and coupled to the level body, the clip comprising an aperture;
an outer member comprising a moveable wall received within the clip and a projection extending from the moveable wall; and
a locking member received within the outer member, wherein the locking member pushes the moveable wall such that the projection engages the aperture of the clip coupling the outer member to the level body.

2. The level of claim 1, wherein the clip further comprises a pair of opposing clip sidewalls that extend from a clip endwall, wherein the aperture of the clip is defined in one of the sidewalls.

3. The level of claim 2, wherein the pair of clip sidewalls each extend along the inner surface of one of the sidewalls of the level body.

4. The level of claim 2, wherein the clip further comprises a second aperture, wherein one of the apertures is defined in each of the sidewalls of the clip.

5. The level of claim 2, wherein the clip further comprises a boss extending outward from an outer surface of each of the clip sidewalls, wherein each sidewall of the level body comprises openings that receive the bosses of the clip.

6. The level of claim 2, wherein the clip further comprises a rib slot defined along an outer surface of each of the clip sidewalls, wherein inner surfaces of each of the level body sidewalls define a rib that is received in one of the rib slots of the clip.

7. The level of claim 2, wherein the clip sidewalls each extend in a direction that is substantially parallel to the inner surfaces of the level body sidewalls.

8. The level of claim 1, wherein the locking member is formed from a material that is more rigid than a material of the outer member.

9. The level of claim 1, wherein the locking member comprises a stop structure that engages a cooperating surface of the outer member such that full removal of the locking member from the outer member is prevented when the locking member is in an unlocked position.

10. The level of claim 1, wherein the outer member comprises a cap portion, a first side arm extending outward from an upper end of the cap portion and a second sidearm extending outward from a lower end of the cap portion.

11. The level of claim 10, wherein the first side arm extends along an inner surface of the upper wall of the level body and the second side arm extends along an inner surface of the lower wall of the level body when the outer member is received within the clip.

12. The level of claim 1, wherein the projection of the outer member is located completely within the hollow area.

13. The level of claim 12, wherein the projection does not extend through the level body.

14. A level comprising:
a level body comprising an inner surface defining a hollow open area, a first end, a second end and a longitudinal axis extending from the first end to the second end;
a level vial supported by the level body; and
an end cap assembly detachably coupled to each of the first and second ends of the level body, at least one of the end cap assemblies comprising:
a clip received within the hollow open area of the level body and coupled to the level body, the clip comprising an aperture located adjacent to the inner surface of the level body;
an outer member comprising a moveable portion received within the clip and a projection extending from the moveable portion; and
a locking member received within the outer member, wherein the locking member is moveable within the outer member between a locked and unlocked position, wherein, in the locked position, the locking member pushes the moveable portion such that the projection engages the aperture of the clip coupling the outer member in a fixed position relative to the level body.

15. The level of claim 14, wherein the clip further comprises a pair of opposing clip sidewalls that extend from a clip endwall, wherein the aperture of the clip is defined in one of the clip sidewalls.

16. The level of claim 15, wherein the level body comprises a pair of sidewalls, wherein the pair of clip sidewalls extend along inner surfaces of the sidewalls of the level body.

17. The level of claim 14, wherein the locking member is formed from a material that is more rigid than a material of the outer member.

18. The level of claim 14, wherein the locking member comprises a stop structure that engages a cooperating surface on the outer member such that full removal of the locking member from the outer member is prevented when the locking member is in the unlocked position.

19. A level comprising:
a level body comprising an inner surface defining a hollow open area, a first end, a second end and a longitudinal axis extending from the first end to the second end;
a level vial supported by the level body; and
an end cap assembly detachably coupled to each of the first and second ends of the level body, at least one of the end cap assemblies comprising:
an outer member received within the hollow open area, the outer member comprising a moveable portion; and
a locking member received within the outer member, wherein the locking member is moveable within the outer member between a locked and unlocked position, wherein, in the locked position, the locking member pushes the moveable portion in to a frictional engagement that couples the outer member in a fixed position relative to the level body.

20. The level of claim 19, wherein the end cap assembly comprises a clip received within the hollow open area of the level body, wherein the frictional engagement is between the clip and the moveable portion of the outer member.

\* \* \* \* \*